United States Patent [19]

Vergnaud et al.

[11] Patent Number: 5,712,983
[45] Date of Patent: Jan. 27, 1998

[54] DIGITAL DEVICE FOR CONNECTING MULTIPLE WORKSTATIONS TO A TOKEN RING LOCAL AREA NETWORK

[75] Inventors: Gérard Vergnaud, Franconville; Abdelkrim Moulehiawy; Gérard Vuillemin, both of Paris; Olivier Lemezec, Montrouge, all of France

[73] Assignee: Alcatel N.V., Amsterdam

[21] Appl. No.: 313,793

[22] Filed: Sep. 28, 1994

[30] Foreign Application Priority Data

Sep. 29, 1993 [FR] France ................... 93 11622

[51] Int. Cl.[6] .................... G06F 13/00; G06F 15/163
[52] U.S. Cl. ................. 395/200.2; 395/200.02; 395/200.1
[58] Field of Search .............. 395/200.2, 200.01, 395/200.02, 200.1; 370/94.3, 85.3, 85.4, 911, 401, 406

[56] References Cited

U.S. PATENT DOCUMENTS

| 5,315,593 | 5/1994 | Adachi et al. ............. 370/94.3 |
| 5,371,766 | 12/1994 | Gersbach et al. ............ 375/119 |
| 5,432,481 | 7/1995 | Saito .................... 331/45 |

FOREIGN PATENT DOCUMENTS

0046203A1  2/1982  European Pat. Off. .

OTHER PUBLICATIONS

H. J. Keller et al, "Transmission Design Criteria for a Synchronous Token Riing", *Journal on Selected Areas in Communications*, vol. SAC-1, No. 5, Nov. 1983, New York, pp. 721-733.

D. Folkes, "Serial Network Simplifies the Design of Multiple Microcomputer Systems", *Electro '81/Conference Record*, vol. 6, Apr. 1981, pp. 1-10.

T. Pai, "FIFO RAM Controller Tackles Deep Data Buffering", *Computer Design*, vol. 25, No. 1, Aug. 1986, pp. 109-112.

French Search Report FR 9311622.

*Primary Examiner*—Larry D. Donaghue
*Assistant Examiner*—Mark H. Rinehart
*Attorney, Agent, or Firm*—Sughrue, Mion, Zinn, Macpeak & Seas, PLLC

[57] ABSTRACT

Each station is connected to the token ring network (5) through station and token ring interface units, the latter of which units has a switch (37) for connecting the station to the token ring (5) to transmit signals it receives in digital form either from the token ring or from the station via the associated station interface unit. The data signal received from a station clocked by an oscillator of that station is transcoded in the associated token ring interface unit before it is recoded in its original form under the control of an oscillator (12) common to the stations of the device which is slaved to the oscillator of one of the stations taken as a master station.

5 Claims, 2 Drawing Sheets

5,712,983

DIGITAL DEVICE FOR CONNECTING MULTIPLE WORKSTATIONS TO A TOKEN RING LOCAL AREA NETWORK

BACKGROUND OF THE INVENTION

The present invention concerns a digital device for connecting a plurality of workstations, such as microcomputers or computer terminals, to a token ring local area network.

Prior art, functionally circular "token ring" local area networks connect a plurality of workstations, typically from around one hundred to several hundred workstations.

The first installations of this type had a local area network or token ring clock frequency in the order of 4 Mbit/s.

Current requirements are such that a local area network clock frequency virtually four times higher is needed.

The specifications for such installations are the same as for existing installations in which the code employed is typically a "differential Manchester" type code, i.e. a code in which only the changes of level or transitions are meaningful. This code embodies its own clock and it is possible to convert it to a different code characterized by the duration of its successive symbols, each equal to one or more basic periods, with a maximum of four basic periods.

Another code includes "long", "medium" and "short" symbols, a "long" symbol having a duration equal to three basic periods, a "medium" symbol having a duration equal to two basic periods and a "short" symbol having a duration equal to a single basic period.

For installations to operate at a clock frequency or token ring speed significantly higher than that mentioned above, there is the further requirement to conform to the same connection distances—typically in the order of 100 m—between each station and the token ring as in the prior art installations mentioned above.

Studies carried out by the Applicant have shown that, in an installation of this type operating at a token ring bit rate in the order of 16 Mbit/s, this connection distance in the order of 100 m would be possible if the host system associated with the token ring were provided with devices for shaping the signals emanating from each station.

However, given the very high speed at which data circulates on the token ring, the system becomes highly sensitive to "jitter" (inevitable small variations in the frequency of the signal pulses), the amount of jitter increasing with the number of workstations connected to the token ring.

For a token ring clock frequency of 16 MHz and merely using additional shaping of the signals at the level of the token ring, it has been found impossible at present to connect to the token ring a number of workstations exceeding around 130, which is well below the current performance expectations for this type of installation, which would preferably provide the capability to connect around 250 workstations to the token ring.

SUMMARY OF THE INVENTION

The invention is directed to remedying this drawback. To this end it concerns a digital device for connecting a plurality of workstations to a token ring local area network in which digital data signals are coded by a specific method, said device including a token ring interface unit for each station, each unit having a switch for connecting the station to the token ring.

In accordance with one feature of the invention the device includes a voltage-controlled oscillator which is slaved to the digital data signal send clock from one of the stations of the device selected as a master station under the supervision of a central logic unit and which supplies a clock to the token ring interface units.

Each token ring interface unit includes:

- a detector for processing the data signal (DIN) from the station;
- a coder for transcoding this data signal under the control of the clock from the oscillator of the device;
- a transcoded signal memory at the coder output;
- logic receiving an indication relating to the station send clock via the coder, an insertion request signal at the initiative of the station, and an indication of the token ring clock frequency from the central logic unit to which it sends in return an indication as to the possibility of inserting the station into the token ring according to the respective clock frequencies of the station and of the token ring;
- a code regenerator connected between the output of the memory and an input of the unit switch supervised by the logic for transmitting on the token ring the data signal recoded in its original form under the control of the token ring clock when the station is inserted into the token ring by the switch under the control of the logic; and
- a clock deriving the token ring clock from the oscillator clock, to the benefit of the code regenerator.

In accordance with a second feature of the invention, for networks in which the digital signals transmitted are coded in a code such as a "differential Manchester" type code which can be translated using two bits per symbol transmitted according to the spacing between successive transitions of the signal characterized in that each token ring interface unit includes:

- an edge detector for detecting changes of state of the digital data signal from the station;
- a sampler counter type coder receiving the clock from the oscillator and the change of state indications supplied by the edge detector to code on two bits the symbols of the data signal from the station; and
- a code regenerator adapted to the recoded data signal from the corresponding series of symbols temporarily stored in the memory at the rate of two bits per symbol.

In accordance with a third feature of the invention the clock of a token ring interface unit of a station includes a phase-locked loop receiving the data signal from the station and supplying a clock whose frequency is twice the clock frequency of the station for successive extraction of the symbols stored in the memory and for output to the station via the switch of the recoded data signal for checking.

In accordance with a fourth feature of the invention the symbol memory includes empty memory and full memory limits used by the central logic unit to determine which station is the master station the digital data signal of which is selected to control the oscillator of the device.

In accordance with a fifth feature of the invention the clock of each token ring interface unit includes adapter units controlled by the logic and enabling the device to operate at one or the other of different token ring clock frequencies.

BRIEF DESCRIPTION OF THE DRAWINGS

The invention, its advantages and features emerge from the following description of one embodiment of the invention given with reference to the appended diagrammatic drawing in which.

DESCRIPTION OF THE PREFERRED EMBODIMENT

Figure 1:
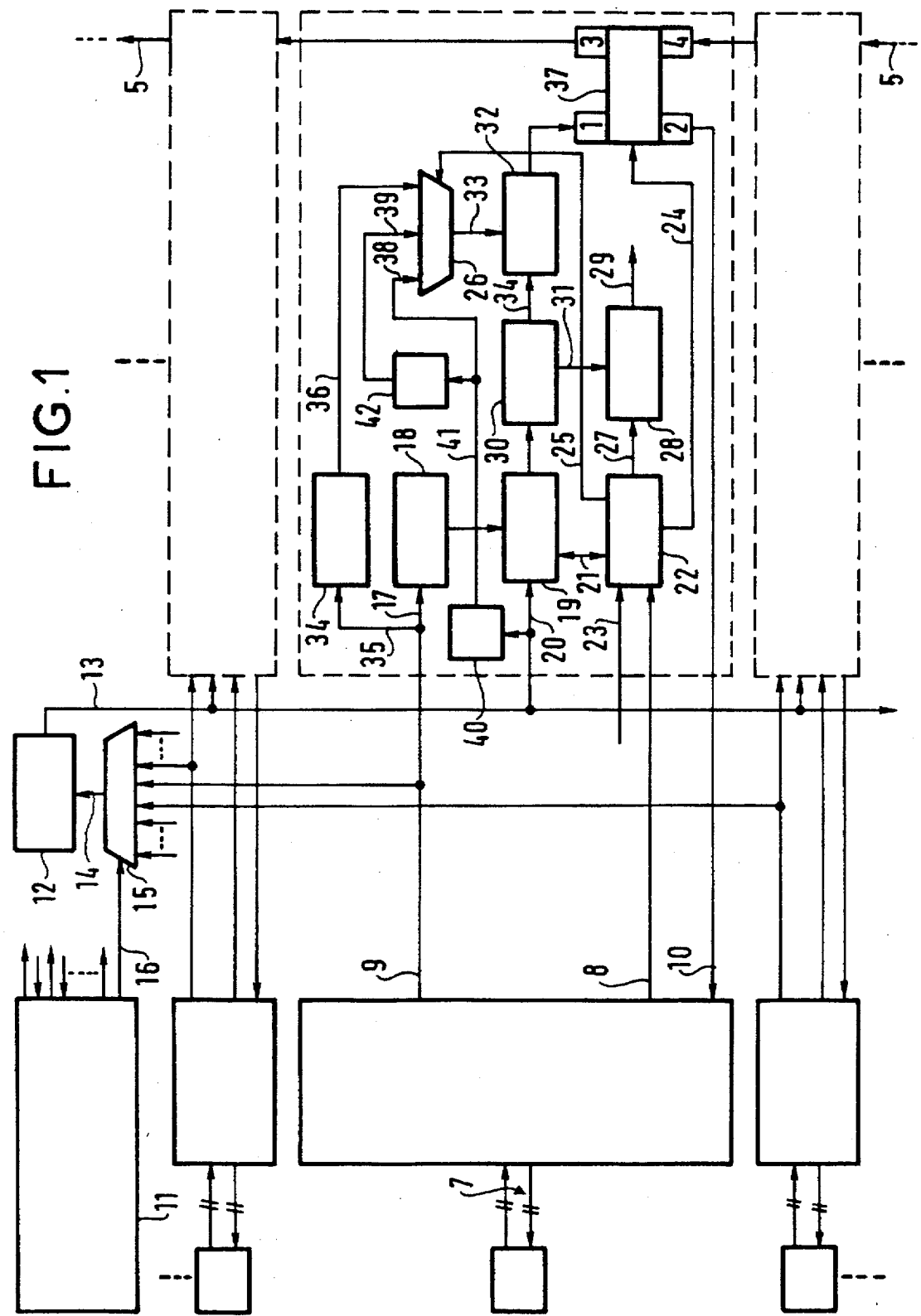
FIG. 1 is a block diagram of a device for connecting a plurality of workstations to a token ring local area network.

FIG. 1 is a block diagram showing part of an installation for connecting a plurality of workstations (not shown) to a token ring local area network 5.

The data clock frequency (or "token ring speed") of the data frames transmitted by the token ring has a particular value characteristic of the installation.

In the case of the embodiment of the present invention described here, it corresponds to a bit rate of either 4 Mbit/s or 16 Mbit/s.

The installation conforms to IEEE specification 802.5.

Figure 2:
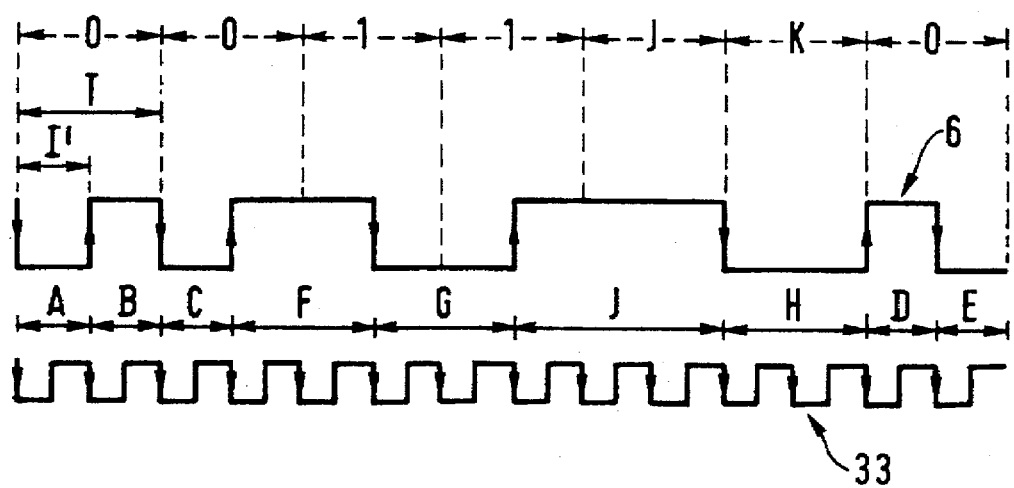
FIG. 2 is a clock diagram for the differential Manchester code.

The signal sent and received by each station and those circulating on the token ring are coded in the "differential Manchester" code whose structure is shown in FIG. 2 (signal 6).

The clock diagram 6 shows the sequence of bits or symbols "0 0 1 1 J K 0" in the differential Manchester code. The duration of each bit is equal to the period T which is the reciprocal of the data signal clock frequency. This period T is equal to two basic intervals I'.

In the differential Manchester code only changes of state (i.e. rising or falling edges, marked with an arrow in diagram 6) are meaningful.

By definition, in this code:

a "0" bit is defined by a change of state at the beginning and in the middle of a bit, as can be seen in diagram 6;

a "1" bit is defined exclusively by a change of state in the middle of period T;

a symbol "J" is defined by the absence of any change of state during period T; and a symbol "K" is defined by the presence of a single change of state at the start of a period.

The symbols "0" and "1" are information bits. The symbols "J" and "K" are violations of the code which are used, for example, to mark the start and the end of data frames.

Consideration of the coded signal 6 shows that this signal is made up of a series of three sorts of signals with different durations or spacings:

"short" symbols A, B, C, D, E whose duration is one basic interval I' (and therefore half the period T);

"medium" symbols F, G, H whose duration is equal to two intervals I'; and

"long" symbols J whose duration is equal to three basic intervals I'.

It is therefore possible to convert the series 6 into a series of long, medium, short signals which can each be represented by a respective binary number (11, 01, 10) which gives their length and comprises only two bits. This property is used in this installation, in the manner described below.

Returning now to FIG. 1, connectors C(i−1), C(i), C(i+1), etc connect the interface device via a cable approximately 100 m long to respective workstations (not shown).

The signals passing through the connectors C can be analog signals.

All of the following description relates to station i, but the part of the block diagram relating to station i is repeated identically on this diagram for all the other stations. In other words, everything indexed (i+1) or (i−1) in this diagram is identical to what is indexed (i) in relation to station i.

The installation shown in the block diagram connects one of 16 stations to the token ring local area network 5. In reality the invention offers the facility to connect one station of up to 250 stations.

The overall installation includes a plurality of devices identical to that of FIG. 1, for example 15 devices each connected to 16 stations, these devices being connected in series around the token ring 5.

Each connector C is connected by a double two-wire bidirectional link 7 to a station interface unit, for example the unit A(i) for station i. The main functions of this unit are isolation, filtering, analog/digital conversion and digital/ analog conversion. In one embodiment of the invention, when a station wishes to be inserted into the token ring it generates a DC voltage applied between center-taps of secondary windings of two output transformers of the station. This voltage is passed to a detector via the link 7. The station interface unit responds by generating at an output 8 an insertion request (or "Phantom-Drive") signal PHD.

The station interface unit also transmits differential Manchester coded data from the station to the token ring 5 via an output 9 (see signal 6 in FIG. 2). It likewise receives digital data signal bit streams from the token ring 5 via an input 10 and a digital token ring interface unit, for example unit N° i for station interface unit A(i).

The token ring interface unit includes an electronic switch 37 for connecting the associated station to the token ring. This switch is described below with reference to FIG. 3.

The following are associated with the 16 token ring interface units of a device:

a central control and computation logic unit 11, based on a microprocessor, for example;

a voltage-controlled oscillator 12 which supplies a clock Hvcxo over a link 13 to a clock input of each of the token ring interface units. This jitter-free clock Hvcxo has a fixed frequency which is at least four times the clock frequency of the token ring 5; in this embodiment of the invention the clock Hvcxo is a 64 MHz clock.

The control input 14 of the oscillator 12 receives a control signal which slaves it to the clock of the token ring 5 (in practise the clock of the master station data signal DIN). One property of the master station (the station i+1, for example) is that it operates at a fixed clock frequency equal to the clock frequency of the token ring 5.

As shown in FIG. 1, all the data signals DIN of the stations of the device are in practise supplied to a multiplexer 15 whose control signals are supplied by the central logic unit 11 via a link 16. This unit knows which station is the master station (see below).

The digital signal DIN from the master station conveys the token ring clock, being in the differential Manchester code of which this is one fundamental property. The clock Hvcxo is therefore slaved to the token ring frequency.

Token ring interface unit N° i is described next, bearing in mind that the master station could be a station other than station i+1, for example station i−1 or station i.

When the device is initialized the oscillator 12 is not locked on and therefore oscillates at a particular frequency which is usually not the token ring frequency. Also, the master station has yet to be recognized by the central logic unit 11 of the device.

When this problem has been solved, in the manner described below, the oscillator 12 is slaved to the clock of the digital data signal DIN from the master station, i.e. to the token ring clock. As mentioned above, in this example the frequency of the oscillator 12 is 64 MHz. It is four times that of the token ring if the latter operates at 16 MHz and 16 times greater for operation of the token ring at 4 MHz.

Assume that a station, for example station i, requires to be inserted into the network, which entails operating the switch 37 in the corresponding token ring interface unit. This switch has four terminals 1, 2, 3, 4.

The signals circulating on the token ring 5 enter the station at terminal 4 and leave the station at terminal 3.

The signals from the station enter the switch 37 at terminal 1 and can be returned to the station from terminal 2 which can also transmit to the station signals arriving from the token ring via terminal 4.

Initially, when the station is not inserted into the token ring, the terminal 4 is connected to the terminal 3 and the terminal 1 is connected to the terminal 2.

Initially a station i starts by testing its own link, independently of the token ring 5, before sending an insertion control signal (this is signal PHD(i) for station i). To this end it sends a data signal DIN(i), in this case, to its token ring interface unit via its station interface unit. This signal is made up of at least one test data frame sent under the control of the clock specific to the station. This test frame of the signal DIN(i) is sent over the link 9 by the station interface unit A(i), passes through the token ring interface unit N° i and is then transmitted from terminal 1 to terminal 2 of the switch 37, after which it is returned to the station in the form of a signal DOUT(i).

The signal DIN(i) is as shown in diagram 6 in FIG. 2, for example. It is applied to the input 17 of an edge or change of state detector 18 of the token ring interface unit N° i.

The edges of the signal DIN(i) detected by the detector 18 are processed by a counter/sampler type coder 19 which determines the time between successive edges received by counting under the control of the clock supplied by the oscillator 12 and applied to its counting input 20.

The result of this counting, i.e. the duration of the successive symbols, is transmitted over a link 21 to combinatorial logic 22 whose functions include those of a bit rate analyzer.

The logic 22 also receives the insertion request signal PHD over the link 8 and, over a link 23, information from the central logic unit 11 telling it the clock frequency or "speed" at which the token ring 5 operates.

The logic 22 supplies a control signal to the switch 37 via an output 24, a select signal to a multiplexer 26 of its token ring interface unit via an output 25 and an information signal to the central logic unit 11 of the device via an output. 27, an alarm circuit 28 and a link 29.

The station i in question can therefore send and recover test data frames under the control of its own clock via the link 9 and the link 10 which unite the station interface unit A(i) and the token ring interface unit N° i and which are then switched in series by the switch 37 of the token ring interface unit, in particular to verify that the latter is operating correctly.

During this initial phase the logic 22 checks that it is possible to connect to the token ring, in particular by verifying that the code of the signal received is appropriate (i.e. that it is of the differential Manchester type in this example) and that the station bit rate is compatible with that used on the token ring, an indication of the clock frequency in use on the token ring being supplied to it by the central logic unit 11 at its input 23.

If connection is not possible, the logic 22 sends an indication that it is not possible to insert the station into the token ring to the central logic unit via the alarm circuit 28. Otherwise the coder 19 codes on two bits each of the successive (short, medium, long) symbols of the signal that it receives from the edge detector 18 and sends the result of this coding to a first in/first out (FIFO) memory 30.

The memory 30 has two limits, one of which is reached when the memory is almost empty and the other when it is almost full. These limits are reached if the rate of reading the memory 30 is not compatible with the rate of writing it, in which case the memory supplies an alarm signal to the central logic unit 11 via an output 31, the alarm circuit 28 and the link 29.

The transcoded data corresponding to the symbols of the signal stored in the memory 30 is read under the control of the clock of the station and output in the original code when sent back to the station which sent it via terminals 1 and 2 of the switch 37 and the link 10 in the test phase.

This is done using a transcoder type code regenerator 32 including a shift register in which the pairs of bits from the memory 30 are transferred under the control of the clock applied to its activation input 33 via the link 34.

The extraction is performed under the control of the clock of the station, the data frames produced by this station not being transferred to the token ring in this situation.

A phase-locked loop 34 receives at its reference input 35 the digital data signal DIN—the signal DIN(i) in this instance—supplied by the station and incorporating the clock; this loop supplies a clock slaved to the incoming clock and at twice its frequency on an output link 36.

In this initial test phase the logic 22 applies a selection signal to the multiplexer 26 via the link 25. This signal brings about temporary connection of the link 36 to the code regenerator 32 to which the clock supplied by the loop 34 is therefore applied. This enables output of the frame sent on the link 9 under the control of the clock of the station i.

Since at this time the logic 22 is not receiving the insertion signal PHD, it commands via the link 24 interconnection of terminals 1 and 2 of the switch 37. The output test frame is therefore returned to the station i via the link 10, which enables this station to verify that the link to the token ring 5 is correct and can be used.

In order to be inserted into the token ring station i sends an insertion signal PHD(i) to the logic 22 and the logic commands the switch 37 via the link 24.

As an alternative to this, the insertion signal could be sent to the switch 37 and to the logic 22 at the same time.

In response to the signal PHD(i) received on the link 24 the switch 37 interconnects its terminals 1 and 3. It also interconnects its terminals 4 and 2, which inserts the station into the token ring.

The logic 22 knows the token ring clock frequency because of the information supplied to it by the central logic unit 11 via the wire 23. In this example, it knows whether this frequency is4 MHz or 16 MHz. It responds by sending a selection signal over the link 25 to command the multiplexer 26 to select:

either a first link 38 to which a clock at a fixed frequency of 32 MHz is applied from the oscillator 12 if the token ring clock frequency is 16 MHz ;

or another link 39 to which a clock signal with a fixed frequency of 8 MHz is applied from the oscillator 12 if the token ring clock frequency is 4 MHz.

The 32 MHz clock transmitted via the link 38 is obtained by dividing down the clock Hvcxo supplied by the oscillator 12 using a divider 40 which divides by two.

The 8 MHz clock transmitted via the link 39 is obtained by dividing down the signal appearing at the output 41 of the divider 40 by means of a divider 42 which divides by four.

The data signal DIN(i) which is supplied by the station i to be inserted into the token ring is then processed by the token ring interface unit N° i in the same way as it previously processed the test frame. The bits stored in the memory 30 are transcoded by the code regenerator 32 under the control of the extracted clock Hvcxo.

Although the data signal is processed by the sampler 32 under the control of the clock Hvcxo, it is the clock of the data bit stream DIN supplied by the station which sets the rate of writing the memory 30, via the edge detector 18. In the present example the code regenerator 32 reads the memory 30 under the control of the clock Hvcxo. Consequently, to prevent the memory 30 reaching either limit, and the alarm signal on the wire 31, the rates of writing and reading the memory 30 must be identical. This applies when the system is operating normally, because either the station in question is the master station and then operates by definition under the control of the token ring clock, or it is not the master station and also operates under the control of the token ring clock from the voltage-controlled oscillator (not shown) which controls its sending and which is itself slaved to the token ring clock, by means of the data signal "DOUT" received by the station.

If the clock of the station in question is not compatible with the token ring clock, not only can the memory 30 of the token ring interface unit serving it reach a limit but also, and more importantly, the logic 22 of this unit becomes aware of the situation by analyzing the counting carried out by the coder 19 associated with it. An incompatibility signal is then sent to the central logic unit 11 by the logic 22 of this token ring interface unit via the link 27, the alarm circuit 28 and the link 29.

The frequency of the clock applied to the code regenerator 32 via the link 33 is twice the frequency of the regenerated signal at the output of the regenerator 32. This is readily understood on considering FIG. 2 in which the clock transmitted by the link 33 is shown below the signal 6 which corresponds to the signal regenerated by the regenerator 32. The period T shown corresponds to that of the token ring clock. Assuming that the regenerator 32 includes a shift register and that, as shown by the downward arrows in the drawing, the clock transmitted by the link 33 shifts the bits fed into this shift register on its falling edges, it can be seen that there must be two falling edges during a period T. To achieve this the period of the clock on the link 33 must be half the period T, i.e. its frequency must be double the corresponding frequency.

Figure 3:
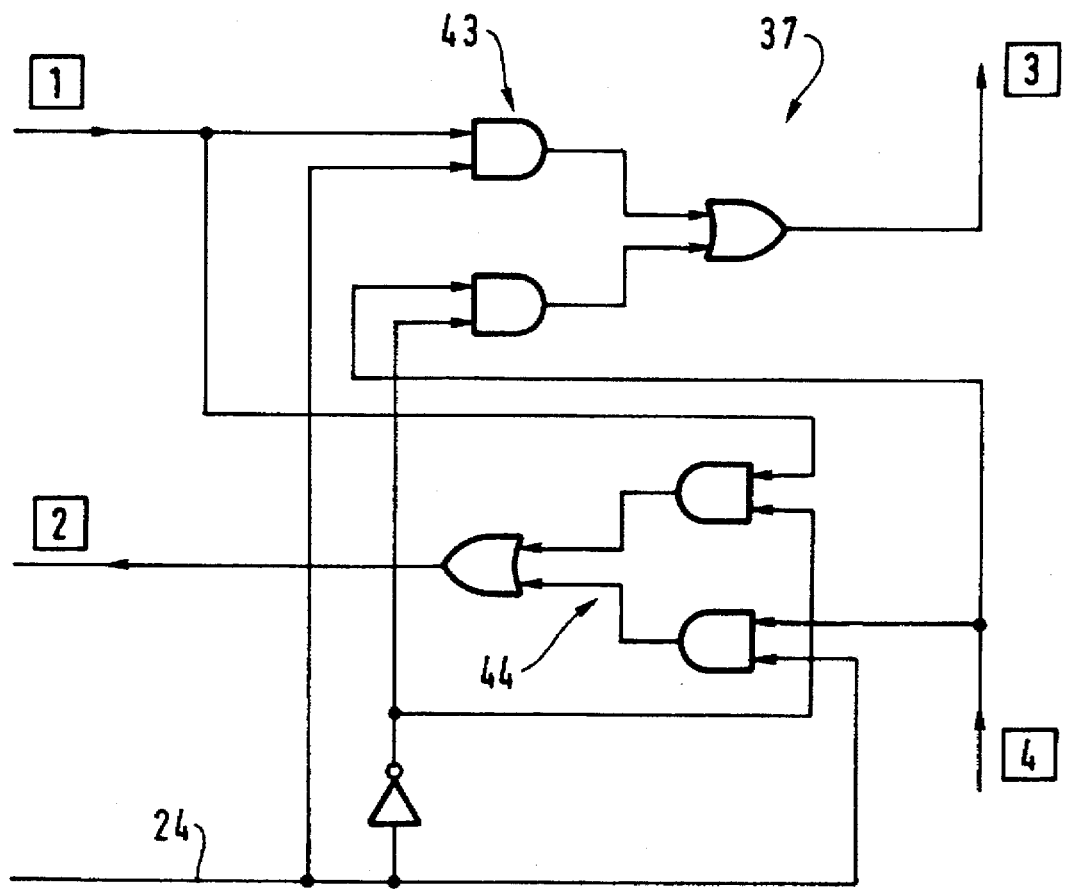
FIG. 3 is an electrical circuit diagram of the switch for inserting a station.

FIG. 3 is a detailed circuit diagram of a switch 37. It comprises an inverter I and two identical circuits 43 and 44 each including two AND gates driving an OR gate. The levels applied to the inputs 24, 1 and 4 of this circuit being logic "0" or "1" levels, it is clear from FIG. 3 that this circuit implements the functions of the electronic switch as defined above.

The oscillator 12 is synchronized to the token ring clock frequency by the central logic unit 11 which operates on the multiplexer 15 via the link 16 to select one of the inputs at which the multiplexer receives the individual data signals DIN from the respective stations served by the device including it.

Each station except the master station has its clock supplied by a voltage-controlled oscillator (not shown) specific to it; this oscillator is normally slaved to the oscillator 12.

The master station is not slaved to the oscillator 12 and therefore oscillates at its own frequency, which is by definition that of the token ring 5.

Initially no signal is sent by the central logic unit 11 to the multiplexer 15 via the link 16 and the oscillator 12 is free running.

The stations then send data signals DIN via their respective station interface units to their respective token ring interface units. All the stations are then synchronized to the clock Hvcxo except for the master station which continues to oscillate at its own frequency.

The rates of writing and reading the memory 30 of the token ring interface unit associated with the master station are then not identical and this memory fills or empties until one of the previously mentioned two limits is reached. An alarm signal is then transmitted to the central logic unit 11 which in this way identifies the master station. The central logic unit responds by commanding the multiplexer via the link 16 to select the input of the multiplexer to which is connected the link 9 over which the data signal DIN from the master station was transmitted.

The token ring interface unit shapes the signals and eliminates jitter. It corrects for any transmission errors caused by the analysis carried out by the logic 22 which verifies that the received data signal is acceptable.

We claim:

1. A digital device for connecting a plurality of workstations to a token ring local area network (5) in which digital data signals are coded by a specific method, said device including a token ring interface unit for each station, the device being characterized in that it includes a voltage-controlled oscillator (12) which is slaved to the digital data signal send clock from one of the stations of the device selected as a master station under the supervision of a central logic unit (11) and which supplies a clock (Hvcxo) to the token ring interface unit, and in that the token ring interface unit of a station comprises:

a switch (37) for connecting the station to said token ring (5);

a coder (19) for transcoding a data signal, sent from the station, under the control of the clock from the oscillator of the device;

a transcoded signal memory (30) at the coder output;

logic (22) receiving an indication relating to the station send clock via the coder, an insertion request signal (PHD) at the initiative of the station, and an indication (23) of the token ring clock frequency from the central logic unit (11) to which it sends in return an indication as to the possibility of inserting the station into the token ring (5) according to the respective clock frequencies of the station and of the token ring;

a code regenerator (32) connected between the output of the memory and an input of the unit switch (37) supervised by the logic for transmitting on the token ring the data signal recoded in its original form under the control of the token ring clock when the station is inserted into the token ring by the switch under the control of the logic; and a clock (33, 40, 42) deriving the token ring clock from the oscillator clock, to the benefit of the code regenerator.

2. A digital connection device according to claim 1 for networks in which the digital signals transmitted are coded in a code such as a "differential Manchester" type code which can be translated using two bits per symbol transmitted according to the spacing between successive transitions of the signal, characterized in that each token ring interface unit includes:

an edge detector (18) for detecting changes of state of the digital data signal from the station;

a sampler counter type coder (19) receiving the clock from the oscillator and the change of state indications supplied by the edge detector to code on two bits the symbols of the data signal from the station; and a code regenerator (32) adapted to reconstitute the recoded data signal from the corresponding series of symbols temporarily stored in the memory at the rate of two bits per symbol.

3. A device according to claim 2 characterized in that the clock of a token ring interface unit of a station includes a phase-locked loop (34) receiving the data signal (DIN) from the station and supplying a clock whose frequency is twice the clock frequency of the station for successive extraction of the symbols stored in the memory (30) and for output to the station via the switch of the recoded data signal for checking.

4. A device according to claim 1 characterized in that the memory (30) of a token ring interface unit includes empty memory and full memory limits used by the central logic unit (11) to determine which station is the master station, the digital data signal (DIN) of which is selected to control the oscillator (12) of the device.

5. A device according to claim 1 characterized in that the clock of each token ring interface unit includes adapter units (26, 42) controlled by the logic (22) and enabling the device to operate at one or the other of different token ring clock frequencies.

* * * * *